United States Patent
Matheny et al.

(10) Patent No.: US 8,621,501 B2
(45) Date of Patent: *Dec. 31, 2013

(54) SYSTEM AND METHOD FOR ENCOURAGING VIEWERS TO WATCH TELEVISION PROGRAMS

(76) Inventors: John R. Matheny, San Francisco, CA (US); Daniel J. Zigmond, Carnation, WA (US)

(*) Notice: Subject to any disclaimer, the term of this patent is extended or adjusted under 35 U.S.C. 154(b) by 97 days.

This patent is subject to a terminal disclaimer.

(21) Appl. No.: 12/951,974

(22) Filed: Nov. 22, 2010

(65) Prior Publication Data

US 2011/0067045 A1 Mar. 17, 2011

Related U.S. Application Data (63) Continuation of application No. 10/835,196, filed on Apr. 29, 2004, now Pat. No. 7,840,975, which is a continuation of application No. 09/566,695, filed on May 8, 2000, now Pat. No. 6,766,524.

(51) Int. Cl.
*H04N 7/16* (2011.01)
*H04N 7/10* (2006.01)
*H04N 7/025* (2006.01)

(52) U.S. Cl.
USPC ................ 725/23; 725/32; 725/36

(58) Field of Classification Search
USPC .................................... 725/37–61
See application file for complete search history.

(56) References Cited

U.S. PATENT DOCUMENTS

| | | |
|---|---|---|
| 4,894,789 A | 1/1990 | Yee |
| 5,010,499 A | 4/1991 | Yee |
| 5,091,877 A | 2/1992 | Itoh |
| 5,121,476 A | 6/1992 | Yee |
| 5,355,484 A | 10/1994 | Record |
| 5,473,673 A * | 12/1995 | Van Wijk et al. .......... 379/92.01 |

(Continued)

FOREIGN PATENT DOCUMENTS

| | | |
|---|---|---|
| EP | 0849946 | 6/1998 |
| EP | 0942595 | 9/1999 |

(Continued)

OTHER PUBLICATIONS

Notice of Allowance dated Aug. 31, 2012 cited in U.S. Appl. No. 11/093,666.

(Continued)

*Primary Examiner* — Mushfikh Alam
(74) *Attorney, Agent, or Firm* — Workman Nydegger (57) ABSTRACT

Methods and apparatus for encouraging viewers to pay attention to commercials by incentivizing viewers to watch. Viewers are notified that they can receive rewards for answering one or more questions during or at the conclusion of the commercial. To verify that the viewer paid attention to the commercial, the answer to the question may be based on the content of the commercial. A sponsor might ask, for example, that the viewer identify the name of the sponsor or the color of an announcer's shirt. A correct answer indicates that the viewer watched the commercial, and the viewer is therefore entitled to some reward. For example, viewers who watch the commercial may be entered in a prize drawing, or may receive prize points, such as frequent-flier miles. In other embodiments, viewers may verify that they watched a given program by selecting an icon or pressing a button on a remote control.

19 Claims, 4 Drawing Sheets

(56) References Cited

U.S. PATENT DOCUMENTS

| | | | | |
|---|---|---|---|---|
| 5,485,553 | A | 1/1996 | Kovalick | |
| 5,488,409 | A | 1/1996 | Yuen | |
| 5,508,731 | A | 4/1996 | Kohorn | |
| 5,526,035 | A | 6/1996 | Lappington | |
| 5,528,490 | A | 6/1996 | Hill | |
| 5,539,822 | A | 7/1996 | Lett | |
| 5,565,895 | A * | 10/1996 | Akatsuka | 725/68 |
| 5,589,892 | A | 12/1996 | Knee | |
| 5,600,632 | A | 2/1997 | Schulman | |
| 5,617,526 | A | 4/1997 | Oran | |
| 5,648,824 | A | 7/1997 | Dunn | |
| 5,737,552 | A | 4/1998 | Lavallee | |
| 5,752,159 | A | 5/1998 | Faust | |
| 5,761,602 | A | 6/1998 | Wagner | |
| 5,761,606 | A | 6/1998 | Wolzien | |
| 5,771,354 | A | 6/1998 | Crawford | |
| 5,774,664 | A | 6/1998 | Hidary | |
| 5,774,666 | A | 6/1998 | Portuesi | |
| 5,778,181 | A | 7/1998 | Hidary | |
| 5,796,967 | A | 8/1998 | Filepp | |
| 5,798,785 | A | 8/1998 | Hendricks | |
| 5,801,747 | A | 9/1998 | Bedard | |
| 5,818,441 | A | 10/1998 | Throckmorton | |
| 5,818,935 | A | 10/1998 | Maa | |
| 5,826,165 | A | 10/1998 | Echeita | |
| 5,832,223 | A | 11/1998 | Hara | |
| 5,835,712 | A | 11/1998 | DuFresne | |
| 5,838,314 | A * | 11/1998 | Neel et al. | 725/8 |
| 5,844,620 | A | 12/1998 | Coleman | |
| 5,845,260 | A * | 12/1998 | Nakano et al. | 705/17 |
| 5,848,352 | A | 12/1998 | Dougherty | |
| 5,848,396 | A | 12/1998 | Gerace | |
| 5,848,397 | A | 12/1998 | Marsh | |
| 5,855,008 | A | 12/1998 | Goldhaber | |
| 5,857,190 | A | 1/1999 | Brown | |
| 5,861,881 | A * | 1/1999 | Freeman et al. | 715/201 |
| 5,862,220 | A | 1/1999 | Perlman | |
| 5,864,823 | A | 1/1999 | Levitan | |
| 5,867,208 | A | 2/1999 | McLaren | |
| 5,889,950 | A | 3/1999 | Kuzma | |
| 5,929,849 | A | 7/1999 | Kikinis | |
| 5,929,850 | A | 7/1999 | Broadwin | |
| 5,931,908 | A | 8/1999 | Gerba | |
| 5,937,331 | A | 8/1999 | Kalluri | |
| 5,940,073 | A | 8/1999 | Klosterman | |
| 5,956,090 | A | 9/1999 | Yamauchi | |
| 5,961,603 | A | 10/1999 | Kunkel | |
| 5,978,828 | A | 11/1999 | Greer | |
| 5,982,445 | A | 11/1999 | Eyer | |
| 5,987,509 | A | 11/1999 | Portuesi | |
| 5,991,596 | A | 11/1999 | Cunningham | |
| 5,991,799 | A | 11/1999 | Yen | |
| 6,002,394 | A | 12/1999 | Schein | |
| 6,002,444 | A | 12/1999 | Marshall | |
| 6,005,565 | A | 12/1999 | Legall | |
| 6,006,256 | A | 12/1999 | Zdepski | |
| 6,006,265 | A | 12/1999 | Rangan | |
| 6,008,836 | A | 12/1999 | Bruke | |
| 6,009,410 | A | 12/1999 | LeMole | |
| 6,011,537 | A | 1/2000 | Slotznick | |
| 6,012,087 | A | 1/2000 | Freivald | |
| 6,018,764 | A | 1/2000 | Field | |
| 6,018,768 | A | 1/2000 | Ullman | |
| 6,021,426 | A | 2/2000 | Douglis | |
| 6,023,698 | A | 2/2000 | Lavey | |
| 6,025,837 | A | 2/2000 | Mathews | |
| 6,026,435 | A | 2/2000 | Enomoto | |
| 6,029,045 | A * | 2/2000 | Picco et al. | 725/34 |
| 6,029,193 | A | 2/2000 | Yamamoto | |
| 6,034,689 | A | 3/2000 | White | |
| 6,035,304 | A * | 3/2000 | Machida et al. | 1/1 |
| 6,049,831 | A | 4/2000 | Gardell | |
| 6,055,564 | A | 4/2000 | Phaal | |
| 6,057,872 | A * | 5/2000 | Candelore | 725/23 |
| 6,058,430 | A | 5/2000 | Kaplan | |
| 6,061,719 | A | 5/2000 | Bendinelli | |
| 6,064,376 | A | 5/2000 | Berezowski | |
| 6,064,440 | A | 5/2000 | Born | |
| 6,075,568 | A | 6/2000 | Matsuura | |
| 6,078,961 | A | 6/2000 | Mourad | |
| 6,081,842 | A | 6/2000 | Shachar | |
| 6,097,441 | A | 8/2000 | Allport | |
| 6,134,379 | A | 10/2000 | LaMacchia | |
| 6,141,678 | A | 10/2000 | Britt | |
| 6,154,771 | A | 11/2000 | Rangan | |
| 6,167,235 | A * | 12/2000 | Sibecas et al. | 340/7.29 |
| 6,169,541 | B1 | 1/2001 | Smith | |
| 6,172,673 | B1 | 1/2001 | Lehtinen | |
| 6,172,677 | B1 | 1/2001 | Stautner | |
| 6,177,931 | B1 | 1/2001 | Alexander | |
| 6,178,114 | B1 | 1/2001 | Yang | |
| 6,195,692 | B1 | 2/2001 | Hsu | |
| 6,198,511 | B1 | 3/2001 | Matz | |
| 6,199,206 | B1 | 3/2001 | Nishioka | |
| 6,201,538 | B1 | 3/2001 | Wugofski | |
| 6,215,483 | B1 | 4/2001 | Zigmond | |
| 6,229,532 | B1 | 5/2001 | Fujii | |
| 6,229,541 | B1 | 5/2001 | Kamen | |
| 6,237,145 | B1 * | 5/2001 | Narasimhan et al. | 725/23 |
| 6,240,555 | B1 | 5/2001 | Shoff | |
| 6,243,741 | B1 | 6/2001 | Utsumi | |
| 6,253,228 | B1 | 6/2001 | Ferris | |
| 6,256,785 | B1 | 7/2001 | Klappert | |
| 6,260,192 | B1 | 7/2001 | Rosin | |
| 6,263,505 | B1 | 7/2001 | Walker | |
| 6,268,849 | B1 | 7/2001 | Boyer | |
| 6,285,407 | B1 | 9/2001 | Yasuki | |
| 6,314,569 | B1 | 11/2001 | Chernock | |
| 6,317,780 | B1 | 11/2001 | Cohn | |
| 6,317,885 | B1 | 11/2001 | Fries | |
| 6,335,736 | B1 | 1/2002 | Wagner | |
| 6,348,932 | B1 | 2/2002 | Nishikawa | |
| 6,351,270 | B1 | 2/2002 | Nishikawa | |
| 6,357,042 | B2 | 3/2002 | Srinivasan | |
| 6,367,080 | B1 | 4/2002 | Enomoto | |
| 6,373,503 | B1 | 4/2002 | Perkes | |
| 6,374,404 | B1 | 4/2002 | Brotz | |
| 6,400,407 | B1 | 6/2002 | Zigmond | |
| 6,412,111 | B1 | 6/2002 | Cato | |
| 6,415,438 | B1 | 7/2002 | Blackketter | |
| 6,446,261 | B1 | 9/2002 | Rosser | |
| 6,460,180 | B1 | 10/2002 | Park | |
| 6,473,903 | B2 | 10/2002 | Balakrishnan | |
| 6,502,243 | B1 | 12/2002 | Thomas | |
| 6,510,557 | B1 | 1/2003 | Thrift | |
| 6,510,558 | B1 | 1/2003 | Linuma | |
| 6,512,551 | B1 | 1/2003 | Lund | |
| 6,522,342 | B1 | 2/2003 | Gagnon | |
| 6,530,082 | B1 | 3/2003 | Del Sesto | |
| 6,560,777 | B2 | 5/2003 | Blackketter | |
| 6,564,379 | B1 | 5/2003 | Knudson | |
| 6,571,392 | B1 | 5/2003 | Zigmond et al. | |
| 6,584,153 | B1 | 6/2003 | Comito | |
| 6,600,496 | B1 | 7/2003 | Wagner | |
| 6,604,239 | B1 * | 8/2003 | Kohen | 705/36 R |
| 6,604,242 | B1 | 8/2003 | Weinstein | |
| 6,615,408 | B1 | 9/2003 | Kaiser | |
| 6,662,007 | B2 | 12/2003 | Yuen | |
| 6,668,378 | B2 | 12/2003 | Leak | |
| 6,681,393 | B1 | 1/2004 | Bauminger | |
| 6,698,020 | B1 | 2/2004 | Zigmond | |
| 6,718,551 | B1 * | 4/2004 | Swix et al. | 725/32 |
| 6,725,461 | B1 | 4/2004 | Dougherty | |
| 6,751,800 | B1 | 6/2004 | Fukuda | |
| 6,754,905 | B2 | 6/2004 | Gordon | |
| 6,766,524 | B1 | 7/2004 | Matheny | |
| 6,886,178 | B1 | 4/2005 | Mao | |
| 6,912,726 | B1 | 6/2005 | Chen | |
| 6,928,652 | B1 | 8/2005 | Goldman | |
| 6,938,270 | B2 | 8/2005 | Blackketter | |
| 6,990,676 | B1 | 1/2006 | Proehl | |
| 6,990,678 | B2 | 1/2006 | Zigmond | |
| 7,103,904 | B1 | 9/2006 | Blackketter | |
| 7,165,266 | B2 | 1/2007 | Zigmond | |

(56) References Cited

U.S. PATENT DOCUMENTS

| | | | |
|---|---|---|---|
| 7,174,562 | B1 | 2/2007 | Leak |
| 7,178,162 | B2* | 2/2007 | Martinolich et al. ......... 725/135 |
| 7,181,756 | B1 | 2/2007 | Zigmond |
| 7,296,282 | B1 | 11/2007 | Koplar |
| 7,543,323 | B1 | 6/2009 | Zigmond |
| 7,568,214 | B2 | 7/2009 | Leak |
| 7,765,575 | B2 | 7/2010 | Zigmond |
| 7,840,975 | B2 | 11/2010 | Matheny |
| 2001/0001160 | A1 | 5/2001 | Shoff |
| 2002/0007493 | A1 | 1/2002 | Butler |
| 2002/0010926 | A1 | 1/2002 | Lee |
| 2002/0053077 | A1* | 5/2002 | Shah-Nazaroff et al. ....... 725/13 |
| 2002/0092017 | A1* | 7/2002 | Klosterman et al. ............ 725/35 |
| 2002/0133816 | A1 | 9/2002 | Greene |
| 2003/0005463 | A1 | 1/2003 | Macrae |
| 2004/0040042 | A1 | 2/2004 | Feinleib |
| 2004/0237119 | A1 | 11/2004 | Smith |
| 2005/0028206 | A1 | 2/2005 | Cameron |
| 2005/0044571 | A1 | 2/2005 | Goldman |
| 2005/0097594 | A1* | 5/2005 | O'Donnell et al. ............. 725/15 |
| 2005/0172331 | A1 | 8/2005 | Blacketter |
| 2006/0015893 | A1* | 1/2006 | Kitsukawa et al. ............. 725/23 |
| 2006/0080717 | A1* | 4/2006 | Barzilay et al. ............... 725/100 |
| 2011/0067045 | A1 | 3/2011 | Matheny |

FOREIGN PATENT DOCUMENTS

| | | |
|---|---|---|
| GB | 2338364 | 12/1999 |
| WO | WO 97/22207 | 6/1997 |
| WO | WO 98/17064 | 4/1998 |
| WO | WO 98/41020 | 9/1998 |
| WO | WO 98/53611 | 11/1998 |
| WO | WO 01/01270 | 1/2001 |

OTHER PUBLICATIONS

Electronic Industries Association EIA-746A, "Transport of Internet Uniform Resource Locator (URL) Information using Text-2 (T-2) Service" (Sep. 1998).
"Uniform Resource Locators for Television Broadcasts," D. Zigmond, (Jun. 1997).
"Uniform Resource Locators for Television and Telephony," D. Zigmond (Oct. 1996).
Advanced Television Enhancement Forum Specification (ATVEF), Version 1.1 revision 26, (Feb. 2, 1999).
R. Panabaker, S. Wegerif, and D. Zigmond, "The Transmission of IP Over the Vertical Blanking Interval of a Television Signal," (Feb. 1999).
"Creating Interactive Television Links," http://developer.webtv.net/itv/links/main.htm (Jun. 9, 1999).
"Displaying Television Broadcasts in Web Pages," http://developer.erbtv.net/itv/embedtv.main.htm (Jun. 9, 1999).
Electronic Industries Association EIA-608, "Recommended Practice for Line 21 Data Service" (Sep. 1994).
Request for Comments (RFC) 791, "Internet Protocol, DARPA Internet Protocol Specification," Sep. 1981.
Bryant, Stewart Dr., "The Liberate Technologies TV Navigator for DTV: A Think Web-Centric Client for Digital Television" Oracle Corporation and Liberate Technologies, Dec. 1999.
Electronic Industries Association EIA—516, "Joint EIA/CVCC Recommended Practice for Teletext: North American Basic Teletext Specification (NABTS)", 89 pages (May 1988).
Advanced Television Enhancement Forum Specification (ATVEF), comment draft Version 1.0, Revision 1, 19 pages (Aug. 1998).
Advanced Television Enhancement Forum Specification (ATVEF), Draft Version 1.1, Revision 19, 32 Pages (Aug. 1998).
Prestion Galla, "How the Internet Works", Special Edition, pp. 66, 67, 142, 143, 150, 151,260, 261, 278, 279 (Dec. 1997).
Intel Intercast Website, "How Does It Work", Pages from www.intercast.com, 8 pages (Jan. 29, 1999).
J. Daniel Gifford, "Teletext Decoder", Radio-Electronics, Apr. 1996, pp. 45-49.
S. Deering, "Host Extensions for IP Multicasting" (Aug. 1989).
J. Postel, "User Datagram Protocol," (Aug. 1980), identified as page "ftp://ftp.isi.edu/in-notes/rfc768.txt".
ECMA—European Association for Standardizing Information and Communication systems, "Standard ECMA—262, 2nd Edition" (Aug. 1998).
W3C, "Document Object Model (DOM) Level 1 Specification" (Oct. 1998), Identified as page http://www.w3.org/TR/1998/REC-DOM-Level-1-19981001/DOM.txt.
W3c, "HTML 4.0 Specification," Chapters 1-18 (Apr. 1998), Identified as page "http://www.w3.org/TR/REC-html40/".
"Netcentives Launches Global Incentive Program," Netcentives Press (download Oct. 25, 1999) Identified as pages "http://www.netcentives.com/press/archive/NC19991021a.html".
"ClickReward™, It all adds up," Netcentives Press (Download Oct. 25, 1999) Identified as page "http.www.netcentives.com/clickrewards/index.html".
Michael B Jones, "The Mircrosoft Interactive TV System: An Experience Report", pp. 17 (Jul. 1997).
"WebTV Networks Introduces It's Revolutionary Next-Generation System-Web TV Plus", on Network Computing News, Sep. 16, 1997, Downloaded from www.ncns.com Jul. 3, 2008.
"WebTV Plus.. Is it Worth an Upgrade?" by Dexter Davenport on Net4tv, Apr. 1, 1998, Downloaded form www.net-4tv.com, Jul. 3, 2008.
U.S. Appl. No. 7,174,562, Mar. 29, 2004, Office Action.
U.S. Appl. No. 7,174,562, Jul. 8, 2004, Office Action.
U.S. Appl. No. 7,174,562, Apr. 20, 2005, Office Action.
U.S. Appl. No. 7,174,562, Aug. 12, 2005, Office Action.
U.S. Appl. No. 7,174,562, Jan. 31, 2006, Office Action.
U.S. Appl. No. 7,174,562, Jul. 3, 2006, Office Action.
U.S. Appl. No. 7,174,562, Oct. 10, 2006, Notice of Allowance.
U.S. Appl. No. 7,174,562, Dec. 13, 2007, Office Action.
U.S. Appl. No. 7,174,562, Jun. 19, 2008, Office Action.
U.S. Appl. No. 09/345,247, Dec. 19, 2002, Office Action.
U.S. Appl. No. 09/345,247, Jun. 4, 2003, Notice of Allowance.
U.S. Appl. No. 09/295,436, Jul. 5, 2002, Office Action.
U.S. Appl. No. 09/295,436, Jan. 15, 2003, Notice of Allowance.
U.S. Appl. No. 09/295,746, Dec. 6, 2000, Office Action.
U.S. Appl. No. 09/295,746, Jul. 18, 2001, Office Action.
U.S. Appl. No. 09/295,746, May 21, 2002, Notice of Allowance.
U.S. Appl. No. 09/087,354, May 9, 2001, Office Action.
U.S. Appl. No. 09/087,354, Jan. 31, 2002, Office Action.
U.S. Appl. No. 09/087,354, Dec. 17, 2002, Office Action.
U.S. Appl. No. 09/087,354, Jun. 19, 2003, Office Action.
U.S. Appl. No. 09/087,354, Dec. 8, 2003, Office Action.
U.S. Appl. No. 09/087,354, May 5, 2004, Office Action.
U.S. Appl. No. 09/087,354, Jul. 13, 2004, Notice of Allowance.
U.S. Appl. No. 09/087,354, Mar. 10, 2005, Supplemental Notice of Allowability.
U.S. Appl. No. 09/099,481, Apr. 12, 2000, Office Action.
U.S. Appl. No. 09/099,481, Sep. 11, 2000, Notice of Allowance.
U.S. Appl. No. 09/099,481, Nov. 9, 2000, Supplemental Notice of Allowability.
U.S. Appl. No. 09/788,985, Feb. 13, 2004, Office Action.
U.S. Appl. No. 09/788,985, Nov. 17, 2004, Office Action.
U.S. Appl. No. 09/788,985, Jun. 17, 2005, Notice of Allowance.
U.S. Appl. No. 11/216,250, Oct. 31, 2006, Notice of Allowance.
U.S. Appl. No. 09/345,223, May 9, 2003, Office Action.
U.S. Appl. No. 09/345,223, Nov. 21, 2003, Office Action.
U.S. Appl. No. 09/345,223, Jun. 3, 2004, Office Action.
U.S. Appl. No. 09/345,223, Oct. 20, 2005, Office Action.
U.S. Appl. No. 09/345,223, Jun. 14, 2006, Notice of Allowance.
U.S. Appl. No. 09/287,985, Aug. 14, 2002, Office Action.
U.S. Appl. No. 09/287,985, Apr. 21, 2003, Office Action.
U.S. Appl. No. 09/287,985, Sep. 25, 2003, Office Action.
U.S. Appl. No. 09/287,985, Mar. 29, 2004, Office Action.
U.S. Appl. No. 09/287,985, Mar. 2, 2005, Notice of Allowance.
U.S. Appl. No. 09/566,695, Apr. 10, 2003, Office Action.
U.S. Appl. No. 09/566,695, Oct. 27, 2003, Office Action.
U.S. Appl. No. 09/566,695, Mar. 1, 2004, Notice of Allowance.

(56) References Cited

OTHER PUBLICATIONS

U.S. Appl. No. 10/835,196, Oct. 22, 2007, Office Action.
U.S. Appl. No. 10/835,196, Jul. 9, 2008, Office Action.
U.S. Appl. No. 10/835,196, Dec. 24, 2008, Office Action.
U.S. Appl. No. 10/893,518, Jan. 8, 2009, Notice of Allowance.
U.S. Appl. No. 11/614,759, Dec. 30, 2008, Office Action.
U.S. Appl. No. 09/412,839, Nov. 22, 2000, Office Action.
U.S. Appl. No. 09/412,839, Jul. 18, 2001, Office Action.
U.S. Appl. No. 09/412,839, Feb. 25, 2002, Notice of Allowance.
U.S. Appl. No. 10/918,864, Oct. 16, 2007, Office Action.
U.S. Appl. No. 10/918,864, May 13, 2008, Office Action.
U.S. Appl. No. 10/918,864, Jan. 21, 2009, Office Action.
U.S. Appl. No. 11/093,666, Aug. 5, 2008, Office Action.
U.S. Appl. No. 11/093,666, Feb. 4, 2009, Office Action.
U.S. Appl. No. 10/893,518, Apr. 30, 2009, Notice of Allowance.
U.S. Appl. No. 11/093,666, Jul. 21, 2009, Office Action.
U.S. Appl. No. 10/835,196, Aug. 31, 2009, Office Action.
U.S. Appl. No. 11/614,759, Dec. 31, 2009, Notice of Allowance.
U.S. Appl. No. 11/093,666, Jan. 20, 2010, Office Action.
U.S. Appl. No. 10/918,864, Feb. 17, 2010, Office Action.
U.S. Appl. No. 11/614,759, Mar. 22, 2010, Notice of Allowance.
U.S. Appl. No. 10/835,196, Sep. 2, 2010, Notice of Allowance.

* cited by examiner

SYSTEM AND METHOD FOR ENCOURAGING VIEWERS TO WATCH TELEVISION PROGRAMS

CROSS-REFERENCE TO RELATED APPLICATIONS

This application is a continuation of U.S. application Ser. No. 10/835,196, filed Apr. 29, 2005, entitled "System and Method for Encouraging Viewers to Watch Television Programs", which is a continuation of U.S. application Ser. No. 09/566,695, filed May 8, 2000, entitled "System and Method for Encouraging Viewers to Watch Television Programs," which applications are each incorporated herein by this reference in their entireties.

BACKGROUND OF THE INVENTION

1. The Field of the Invention

The invention relates generally to supplementing broadcast television programming with interactive content.

2. The Relevant Technology

The Internet is a worldwide collection of networks and gateways. The Internet includes a backbone of high-speed communication lines between major nodes, consisting of thousands of commercial, government, educational, and other computer systems. The World Wide Web (the Web) is a collection of formatted hypertext pages—located on numerous computer systems around the world—that are logically connected by the Internet.

Web browsers provide user interfaces to the Web, allowing individuals to access Internet content from personal computers. Internet terminals, such as those pioneered by WebTV Networks, Inc., have made the Web more accessible by eliminating the need for a personal computer. Instead, Internet terminals, or "set-top boxes," provide Web access using an ordinary television (TV) set as a display and a remote control or wireless keyboard for user (e.g., viewer) input.

Figure 1:
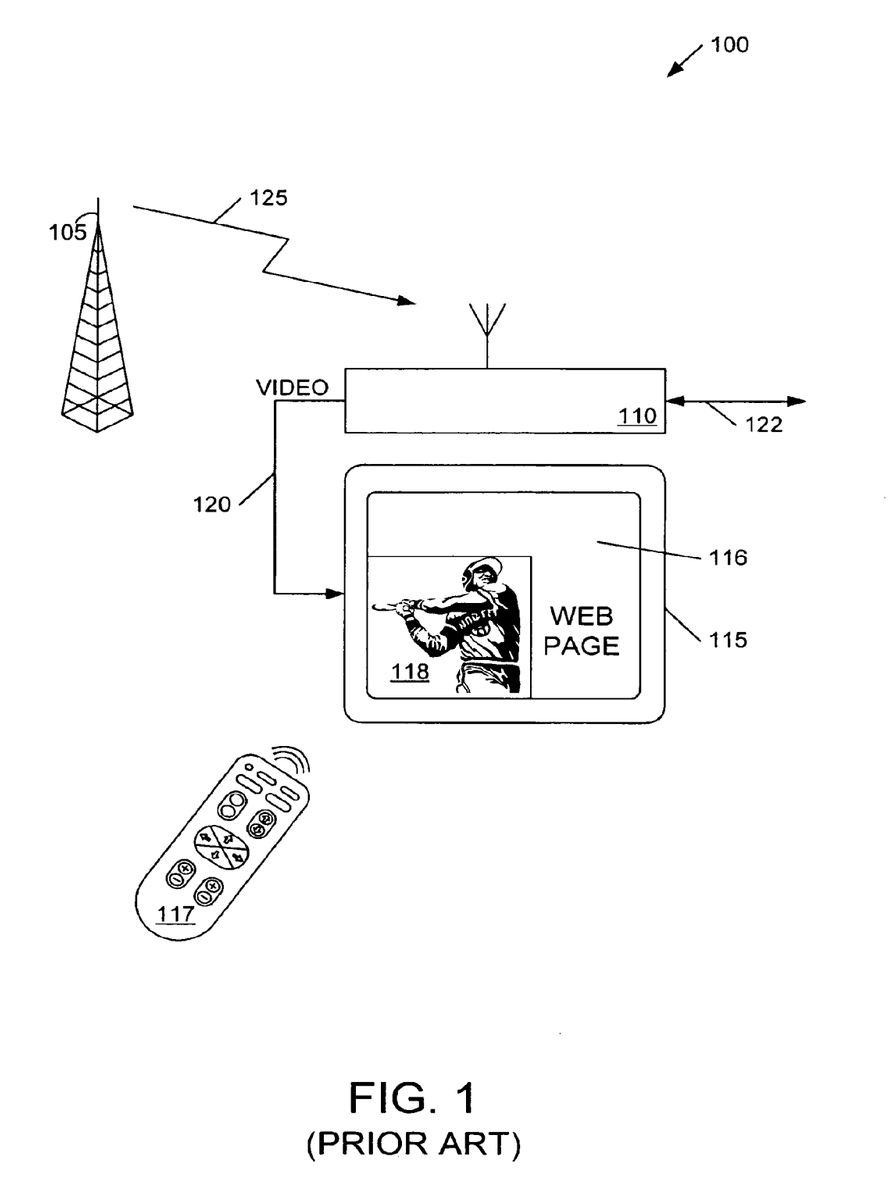
FIG. 1 (prior art) illustrates a conventional interactive television system 100.

FIG. 1 illustrates a conventional interactive television system 100 that includes a broadcast source 105, a set-top box 110, an ordinary analog television set 115, and a remote control 117. Set-top box 110 and television set 115 collectively form a receiver, and may be integrated. Television set 115 displays video data, including a graphical user interface 116 and broadcast video 118, conveyed from set-top box 110 by a video link 120. Video link 120 is an RF (radio frequency), S-video, composite video, or other video link. Set-top box 110 includes a network connection 122 to the Internet. Connection 122 is typically accomplished using a telephone or cable modem.

Set-top box 110 includes hardware and software for receiving and decoding a broadcast video signal 125, and for providing video data to television set 115 via video link 120. Set-top box 110 also includes hardware and software for providing a viewer with graphical user interface 116, capable of displaying both broadcast video and Web content (e.g., HTML or XML pages). A viewer operates remote control 117 to control set-top box 110 to display broadcast TV, browse the Web, and send or receive e-mail. Viewers may also control set-top box 110 using a keyboard (not shown).

Commercial advertising supports the majority of broadcast television. Such advertising is not as effective as it might be, because viewers often use commercials as an opportunity to break from viewing their televisions or to flip to other channels. Advertisers are understandably troubled by either of these alternatives. To make matters worse, again from the perspective of advertisers, recent advances in recording technology have made it easier for viewers to avoid watching commercials. There is therefore a need for a means of encouraging viewers to watch commercials.

BRIEF SUMMARY OF THE INVENTION

The present invention encourages viewers to pay attention to TV programs (e.g., commercials) by offering viewers some incentive to watch. In one embodiment, viewers are notified that they can receive frequent-flier miles for answering one or more simple questions at the conclusion of the program. To verify that the viewer paid attention, the answer to the question may be based on the content of the program. A sponsor of a TV commercial might ask, for example, that the viewer identify the name of the sponsor or the color of an announcer's shirt. A correct answer indicates that the viewer watched the commercial, and that the viewer is therefore entitled to some reward. Possible rewards include entry into a prize drawing or points, such as frequent-flier miles, toward a prize. In other embodiments, viewers need not provide a "correct" answer, but may be rewarded for merely participating in the interactive program. Such participation may include selecting an icon with a pointing device, pressing one or more buttons on a remote control, or sending an email message to a location identified in the program.

Other features of the present invention will be apparent from the accompanying drawings and from the detailed description that follows.

DETAILED DESCRIPTION OF THE PREFERRED EMBODIMENTS

Figure 2:
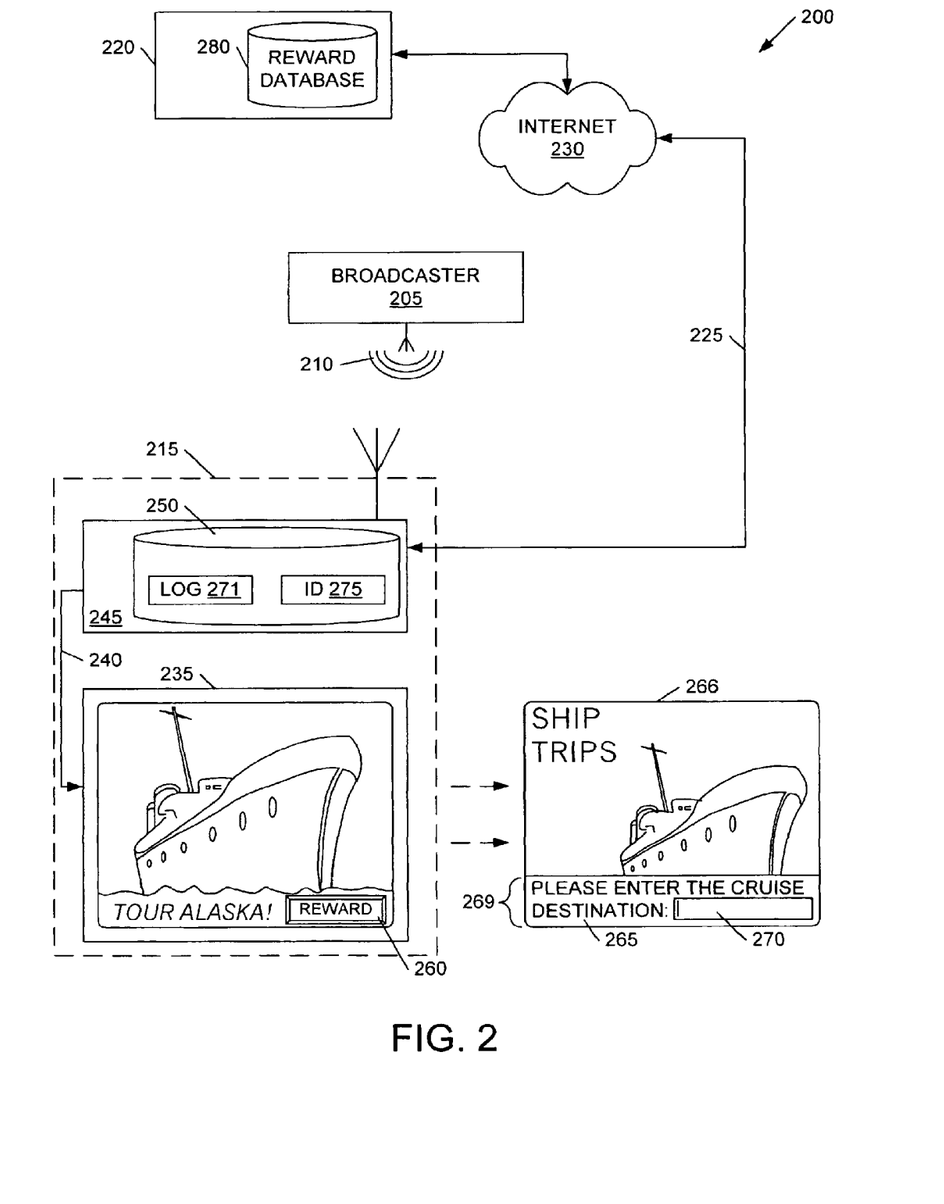
FIG. 2 illustrates a communication system 200 that enables television sponsors to reward viewers for paying attention to broadcast television commercials and other types of broadcast programs.

FIG. 2 illustrates a communication system 200 that enables television sponsors to reward viewers for paying attention to broadcast television commercials and other types of broadcast programs. System 200 includes a broadcaster 205 broadcasting a video signal 210 to a receiver 215. Receiver 215 is adapted to communicate with a remote server 220 via a bi-directional network connection 225 and the Internet 230. Internet 230 is understood to include all required modems, lines, and other components.

Receiver 215 includes a television set 235 connected via a video line 240 to a set-top box 245 similar to set-top box 110 of FIG. 1. Television set 235 and set-top box 245 work together to display Web pages, broadcast television, or both. Web pages are typically downloaded over the Internet 230, but may also be received from video signal 210 or retrieved from a local memory, such as a disk drive 250 in set-top box 245. Set-top box 245 stores pages locally in each case.

In accordance with the invention, broadcaster 205 notifies viewers of television set 235 that they may be rewarded for paying attention to a current or upcoming program, typically a commercial. Later, viewers are presented a question, the answer to which is based upon the content of the program. Viewers that provide the correct answer are entitled to the reward. The identities of viewers who provide correct answers to the question are therefore forwarded to server 220, within which is maintained a database of viewers and corresponding earned entitlements.

For illustrative purposes, receiver 215 depicts a broadcast television commercial sponsored by a cruise line and advertising an Alaskan cruise. In accordance with the invention, television set 235 additionally displays a reward notice 260—in this case an interactive icon—alerting viewers of the possibility of receiving a reward for watching the depicted commercial. In one embodiment, viewers select reward notice 260 to participate in the interactive commercial.

In the example, the sponsoring cruise line is interested having viewers pay attention to the commercial, and is therefore willing to offer some incentive to viewers. For example, viewers who watch the commercial may be entered in a prize drawing, or may receive prize points, such as frequent-flier miles.

The possibility of receiving a reward will entice some viewers to claim rewards without bothering to watch the associated commercial. Thus, in accordance with one embodiment of the invention, viewers must provide some feedback to indicate that they watched the commercial before they are entitled to a reward. In the example of FIG. 2, set-top box 245 presents the viewer with a test question 265 at or near the end to the commercial.

The question is based upon the content of the commercial, so viewers who watch the commercial are able to answer the question correctly. In the example depicted as a subsequent video frame 266 of television 235, a reward query 265 prompts the viewer with a query 269 asking the viewer to enter the previously displayed cruise destination into a form field 270. Entering the correct answer in field 270 entitles a viewer to the offered reward.

Broadcasters may wish to pose questions for which there are no correct answers. For example, a sponsor may wish to ask survey questions. The invention may be adapted to provide rewards to viewers who answer such questions. Further, some viewers may find filling in blanks too cumbersome; thus, other embodiments employ simpler test methods (e.g., multiple-choice or true/false), or reward viewers for merely participating in interactive programs. Such participation may include selecting an icon with a pointing device or pressing one or more buttons on a remote control. Still other embodiments may demand more information from a viewer, such as by prompting the viewer to send an email message to a location identified in the program, and possibly by requiring the viewer fill out an electronic form.

Returning to the example of FIG. 2, if a viewer answers question 269, then set-top box 245 notes the identity of the program in which the question appeared, the time the question was posed, a value expressing how much of the program was viewed, and the viewer's answer to the query. Set-top box 245 then stores this information in a local log file 271 on disk drive 250. In other embodiments, set-top box 245 collects different types of information to identify whether viewers respond to selected programs when prompted.

The contents of log file 271 are eventually pushed to remote information store 220. In one embodiment, set-top box 245 periodically establishes network connection 225 to accomplish this push. Set-top box 245 includes a unique identifier 275, which set-top box 245 communicates to remote information store 220 each time a connection is established. In one embodiment, set-top box 245 automatically establishes connection 225 daily to retrieve updated programming information, and set-top box pushes the contents of log file 271 to information store 220 while connected. Information store 220 then uses identifier 275 to associate an earned reward or some other response with the registered user of set-top box 245. If set-top box 245 cannot communicate with remote information store 220, then set-top box 245 retains the information in log file 271 until communication is established or reestablished. Embodiments employing a constant network connection, such as via a cable network, may not require a log file.

Information store 220 includes a reward database 280 that includes a list of viewers and a corresponding list of reward points. In one embodiment, for example, viewers sign up to obtain frequent-flier miles for watching selected commercials. These viewers are listed in database 280. Earned rewards, such as frequent-flier miles, are then stored in a database field corresponding to the viewer.

The message that includes unique identifier 275 notifies information store 220 that the viewer associated with receiver 215 has answered a query, and may therefore be entitled to a reward. Information store 220 determines, based on the information identifying the program, whether the viewer provided the correct answer. If so, then information store 220 allocates the appropriate reward to the viewer.

In one embodiment, unique identifier 270 is the receiver serial number, and rewards are accumulated by the viewer registered as the owner of set-top box 245. In another embodiment, unique identifier 275 identifies the viewer, who would have been prompted for his or her identity before set-top box presents interactive advertising.

Reward notice 260 and reward query 275 are conveyed in trigger messages, or "triggers," broadcast to receivers of broadcast video. Such triggers generally instruct receivers to take a specific action to synchronize the content of a Web page with a broadcast television program. Reward notices and reward queries may be transmitted in the VBI of a broadcast video signal. The text service channels of line 21 of the VBI provide a robust communication medium, albeit at relatively low bandwidth. In some embodiments of the invention, reward notices and reward queries are text based, and their syntax follows a basic format that complies with the Electronic Industries Association EIA-746A, "Transport of Internet Uniform Resource Locator (URL) Information Using Text-2 (T-2) Service" (September 1998). EIA-746A defines the formatting necessary to transmit Internet URLs using the vertical blanking interval of a broadcast television signal, and is incorporated herein by reference. URLs are a conventional type of universal resource identifier, or "URI," which is a character string used to identify a resource, such as a file. Other types of URIs include local identifiers (LIDs), and universal resource names (URNs).

In one embodiment that complies with EIA-746A, each trigger conveying a reward notice (i.e., each "reward trigger") includes a URI that identifies a reward template stored in local memory in set-top box 245. In the example of FIG. 2, the reward template contains the data required to display and execute the icon of reward notice 260. Each trigger may include additional parameters, such as variables that define the length and identity of the program.

The following is an exemplary reward trigger for use in the embodiment of FIG. 2:

<lid://webtv.net/itv/templates/reward.html?len=30&id= alaska21>[n:REWARD][1234]

The "lid" field includes a URI that identifies a reward template, and specifies a pair of parameters "len" and "id." The "len" parameter specifies the length of the program as 30 seconds, a typical length for a TV commercial. The "len"

parameter tells set-top box 245 when to stop displaying reward notice 260. If the trigger were repeated five seconds, for example, the next reward trigger would have a length attribute of 25. The "id" parameter includes a value that identifies the television program in question. In this hypothetical case, the string "id=alaska21" suggests that this is the Alaska Cruise ad #21. A name parameter "n" provides viewers with readable text. In the embodiment of FIG. 2, the name parameter is associated with the term "REWARD"; other text or symbols can also be used. The last field is an optional checksum that may be used to detect data corruption that may occur during receipt or transmission of a trigger. Preferably, a two byte hexadecimal checksum is employed such as a checksum that would be produced by the standard TCP/IP checksum algorithm described in Request For Comments (RFC) 791, "Internet Protocol, DARPA Internet Program Protocol Specification," September 1981, which is incorporated herein by reference.

Each "query trigger" conveying a reward query (e.g., reward query 265) includes a URI that identifies a query template stored in local memory in set-top box 245. In the example of FIG. 2, the query template contains the data required to display reward query 265. For additional information regarding templates for use with interactive television, see U.S. application Ser. No. 09/345,223 entitled "Methods and Apparatus for Broadcasting Interactive Advertising Using Remote Advertising Templates," by Blackketter et al., filed Jun. 30, 1999, which is incorporated herein by reference.

Each query trigger may include additional parameters, such as variables that convey the text of the query and that define the duration of the query. The following is an exemplary query trigger for use in the embodiment of FIG. 2:

<lid://webtv.net/itv/templates/survey.html?len=20&id= alaska21?>[n:Please enter the cruise destination:] [1234]

The foregoing trigger might bring up a standard "survey" enhancement that asks the viewer to answer the question presented in the name field "n." In other embodiments, the query might be used to rate the commercial or seek other types of information from viewers. As with the above-described reward trigger, the last field is a checksum.

Any trigger can be marked with an expiration date. This might be important if, for example, a commercial is rebroadcast after a reward is no longer available. In such a case, the trigger can include an expiration attribute that specifies a time after which set-top box 245 will no longer execute the trigger. For example, the above trigger can be set to expire on Dec. 31, 1999, by adding an expiration attribute as follows:

<lid://webtv.net/itv/templates/reward.html?len=30&id= alaska21>[n:REWARD] [e:19991231][1234]

Figure 3:
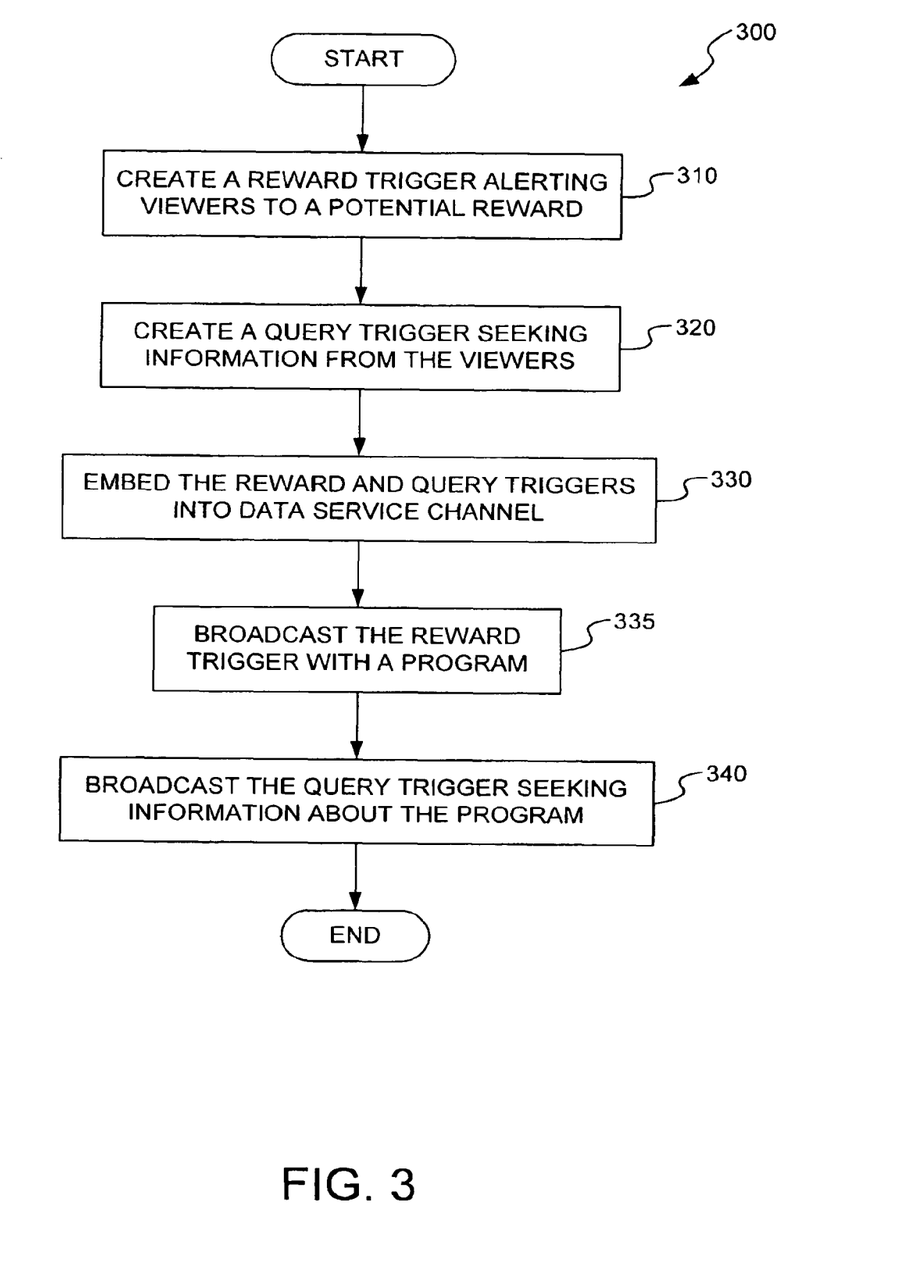
FIG. 3 is a flowchart 300 depicting a method employed by a content creator to encourage viewers to watch a program.

FIG. 3 is a flowchart 300 depicting a method employed by a content creator (e.g., a program producer, broadcaster, affiliate, cable company or satellite provider) to encourage viewers to watch a program. The content creator, typically an employee of a sponsor, first creates one or more reward triggers (step 310) using, for example, the syntax described above. The content creator also creates a query trigger seeking information from viewers that, if provided, will indicate that the viewer watched the program (step 320). The content creator then embeds the reward and query triggers into a data service channel of a video recording (step 330). For example, the reward and query triggers might be embedded into a data service channel of a recorded television program.

Because the reward trigger is meant to alert viewer of the subsequent test, the content creator typically embeds the reward trigger in the video program for display at a time before the query trigger. In other embodiments, a single trigger can be used to both alert viewers of an upcoming test and to administer the test. For example, the reward trigger could include a script that administers the test after a set period following selection of an icon associated with the reward trigger. For a description of how to incorporate scripts in triggers, see application Ser. No. 09/287,985, "Communicating Scripts in a Data Service Channel of a Video Signal," by Dean Blackketter and Daniel Zigmond, which is incorporated herein by reference.

Having prepared the program, including the triggers, the content creator delivers the program to a broadcaster. The broadcaster then broadcasts the program. Because the reward trigger precedes the query trigger in the program, broadcasting the program causes the reward trigger to be broadcast first (step 335). This typically occurs near the beginning of the program, allowing viewers time to respond. Early notice can be especially important for short programs, such as 15 or 30-second commercials. In one embodiment, reward triggers are sent every five seconds or so, so that viewers tuning in late to the corresponding program with have the opportunity to participate. Finally, after a time sufficient to allow viewers to respond to the reward trigger, the broadcaster broadcasts the query trigger to participating viewers (step 340).

In one embodiment, the broadcast video signal is a National Television Standards Committee (NTSC) video signal including a vertical blanking interval (VBI), and the data service channel is selected from a captioning service channel of a text service channel. The video signal may also be Phase Alternate Lines (PAL), Sequential Couleur Avec Memoire (SECAM), High Definition Television (HDTV), or a digital video signal such as a Digital Video Broadcasting (DVB) signal or an Advanced Television Systems Committee (ATSC) signal. Where the broadcast video signal is NTSC video signal, the triggers can be imbedded into line 21 of the vertical blanking interval (VBI). The protocols for broadcasting data in line 21 of the VBI call for relatively robust, low-speed communication. Higher bandwidth can be obtained using other lines of the VBI.

Reward and query triggers need not be provided to a broadcaster with a program. A content creator may embed one or more triggers into a video signal at each point along the video-signal distribution path. Thus, some markets may reward viewers for watching programs, while other markets may elect not to reward viewers for watching the same programs.

Figure 4:
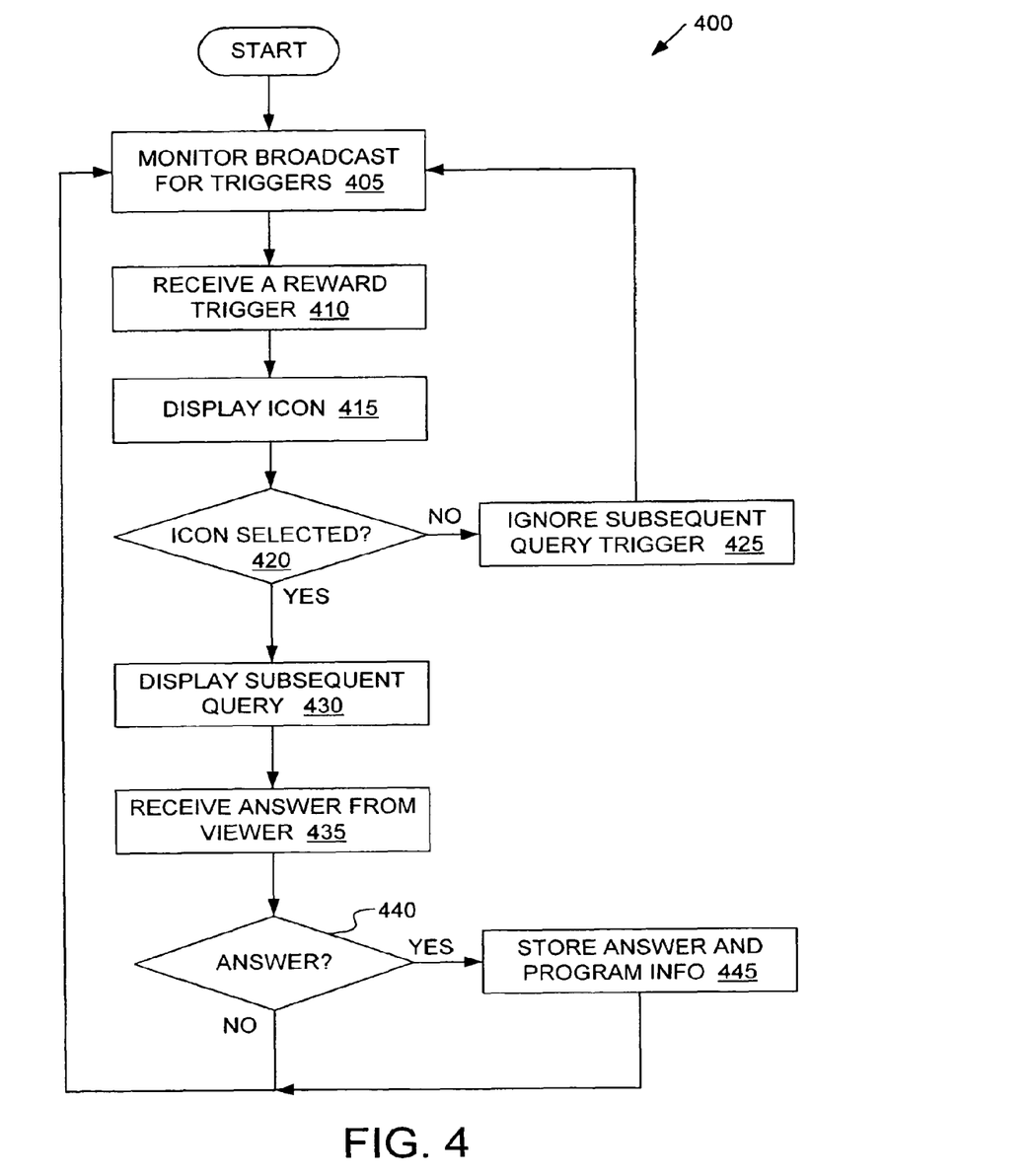
FIG. 4 is a flowchart 400 depicting a method performed by a receiver configured in accordance with the invention to respond to reward and query triggers.

FIG. 4 is a flowchart 400 depicting a method performed by a receiver configured in accordance with the invention to respond to reward and query triggers. The receiver begins by monitoring the broadcast signal for triggers, including reward and query triggers (step 405). Then, upon receipt of a reward trigger (step 410), the receiver displays some icon (step 415), or otherwise notifies viewers of the possibility of receiving a reward for interacting with the program. Incidentally, the term "viewer" is used here for convenience; the invention applies equally where the person receiving information is alerted by sound. Audio alerts are appropriate, for example, for the visually impaired.

The icon offers the viewer the choice of interacting with the program in an attempt to receive some reward. If the viewer does not select the icon (decision 420), then the receiver ignores the subsequent query trigger (step 425) and continues to monitor the broadcast signal. If, on the other hand, the viewer does select the icon (e.g., with a remote control), then the receiver executes the subsequent query trigger to display the associated query (step 430). As explained above in connection with FIG. 2, the query prompts the viewer to enter some information verifying that the viewer watched the program. If the viewer enters an answer (decision 440) before some period defined in the query trigger, then receiver 215 receives (step 435) and records the answer and other information relating to the timing and identity of the program (step 445). Later, typically when the receiver connects to receive programming information, the receiver will send this data to remote information store 220 (see FIG. 2).

Receiver 220 ignores unanswered reward queries, automatically removing them after a time specified in the query trigger.

In one embodiment, viewers are presented a reward query during or after a selected program without first being notified that they may be rewarded for watching the program. A sufficient number of random reward queries, or a sufficient reward, would encourage viewers to pay attention to commercials in the hope of exploiting the occasional reward query.

In one embodiment, reward database 280 receives and stores statistics of interest to sponsors in evaluating the effectiveness of their advertising. For example, one embodiment records the percentage of the program viewed, as indicated by the time between the viewer selecting reward notice 260 and the end of the commercial. In this embodiment, broadcaster 205 sends a trigger for reward notice 260 every five seconds until sending question 265. Subsequent triggers do not overwrite existing icons, and each trigger includes a time stamp. Thus, the time attribute of the selected reward notice 260 can be used to determine the point at which the viewer tuned into the commercial.

The foregoing broadcast and receive methods are embodied in machine-executable instructions, which can be used to cause a general-purpose or special-purpose processor programmed with the instructions to perform the steps. Alternatively, the steps might be performed by specific hardware components that contain hardwired logic for performing the steps, or by any combination of programmed computer components and dedicated hardware.

While the present invention has been described in connection with specific embodiments, variations of these embodiments will be apparent. For example, the queries could be loaded into receivers in advance of commercials, either via broadcast video or a network connection. Therefore, the spirit and scope of the appended claims should not be limited to the foregoing description.

What is claimed is:

1. At a television set-top box receiver that is configured to display video television programming that is broadcast from a broadcast signal source to one or more viewers and to receive, display, and store web content encoded in the broadcast from the broadcast signal source, a method for offering reward incentives for the one or more viewers to watch video commercial programs broadcast during commercial breaks, the method comprising:

at a set-top box receiver, and during a commercial break, receiving a broadcast signal from a broadcast signal source, the broadcast including a video commercial program;

detecting a reward notice trigger in the received broadcast signal, the reward notice trigger storing a location and identity of a reward template stored on the set-top box receiver and at least some text for display to the viewer as notice that the reward notice trigger has been received;

upon detecting the reward notice trigger, generating a reward notice alerting the viewer of a reward for viewing the video commercial program, wherein the reward notice is associated with the reward notice trigger and has a graphical form as defined by the reward template;

detecting a query trigger in the received broadcast signal, the query trigger being received after the reward notice trigger and including a question field storing a question, wherein the question is about content of the video commercial program and a correct answer to the question generally requiring prior viewing of the video commercial program;

displaying the reward notice and, after receiving viewer selection of the reward notice, generating a query interface allowing the viewer to input an answer to the question in the question field of the query trigger, the query interface being based on the query trigger; and transmitting the answer input by the viewer to a central server for a determination as to whether the viewer is entitled to a reward, entitlement to the reward being based at least in part on the central server determining that the viewer watched the video commercial program as a result of the viewer providing a correct answer to the question from the query trigger.

2. The method for offering reward incentives as recited in claim 1, further comprising:

upon receiving the viewer selection of the reward notice trigger, displaying the query interface, the query interface providing a solicitation for the viewer to verify that the viewer watched the video commercial program.

3. The method for offering reward incentives as recited in claim 1, further comprising:

receiving viewer selection of the reward notice;

displaying a solicitation for a viewer response in the query interface; and receiving a reply responsive to the displayed solicitation.

4. The method for offering reward incentives as recited in claim 3, wherein the solicitation is a request that the viewer to input information derived from the video commercial program.

5. The method for offering reward incentives as recited in claim 1, wherein displaying the reward notice comprises displaying the reward notice at a time closer to a beginning of the video commercial program than to an end of the video commercial program.

6. The method for offering reward incentives as recited in claim 1, wherein the reward notice trigger includes at least one time element.

7. The method for offering reward incentives as recited in claim 6, wherein the at least one time element includes an expiration date after which the set-top box receiver should not display the reward notice trigger to the viewer.

8. The method for offering reward incentives as recited in claim 6, wherein the at least one time element includes a length of the video commercial program.

9. The method for offering reward incentives as recited in claim 6, detecting a reward notice trigger comprises detecting a plurality of repeated reward notice triggers during the video commercial program, wherein the at least one time element in each of the repeated reward notice triggers includes a timestamp that is different than the timestamp from each other of the repeated reward notice triggers.

10. The method for offering reward incentives as recited in claim 9, wherein the reward notice selected by the viewer corresponds to a particular one of the repeated reward notice triggers, the method further comprising:

using the timestamp of the particular one of the repeated reward notice triggers in determining a point in time at which the viewer tuned into the video commercial program.

11. The method for offering reward incentives as recited in claim 1, wherein the query trigger defines at least one time element.

12. The method for offering reward incentives as recited in claim 11, wherein the at least one time element defines a time period before which the viewer must input an answer in the query interface.

13. The method for offering reward incentives as recited in claim 11, wherein the at least one time element includes a length parameter identifying when the set-top box receiver is to stop display of the query interface.

14. The method for offering reward incentives as recited in claim 1, wherein at least one of the reward notice trigger or the query trigger is specific to a particular broadcast market.

15. The method for offering reward incentives as recited in claim 1, wherein the query trigger stores a location and identity of a query template stored on the set-top box receiver.

16. The method for offering reward incentives as recited in claim 15, wherein the query trigger stores each of:
   a URI with a local address of the query template;
   a length parameter specifying when to stop display of the query interface; and
   an identification parameter identifying the video commercial program to which the question in the question field corresponds.

17. The method for offering reward incentives as recited in claim 1, wherein the video commercial program is a first video commercial program, the query trigger is a first query trigger, and the query interface is a first query interface, the method further comprising:
   at the set-top box receiver, receiving a second video commercial program from a broadcast source;
   detecting a second query trigger in the received broadcast signal, the second query trigger being received during or after the second video commercial program; and
   generating and displaying a second query interface, the second query interface corresponding to the second query trigger and the second query interface being generated and displayed without receipt of a reward notice trigger corresponding to the second query trigger.

18. A computer program product comprising one or more computer-readable hardware storage devices having computer-executable instructions encoded thereon for implementing the method recited in claim 1.

19. A system comprising:
   a broadcast signal source configured to broadcast a video signal in a broadcast video channel, the video signal conveying a programming sequence including at least regularly scheduled programming and commercial programming;
   a database including a list of viewers, identifications of set-top box receivers corresponding to the list of viewers, and a list of reward values corresponding to the viewers; and
   a set-top box receiver tuned to the video signal and including computer-readable media having stored thereon computer-executable instructions for implementing the method recited in claim 1.

* * * * *